May 19, 1931.  J. HOUSLEY  1,806,464
SPECTACLE PROTECTOR
Filed Oct. 2 1928

WITNESSES
Jos. L. Lamia
A. T. Sperry

INVENTOR
John Housley
BY
Munn & Co
ATTORNEY

Patented May 19, 1931

1,806,464

UNITED STATES PATENT OFFICE

JOHN HOUSLEY, OF ELIZABETH, NEW JERSEY

SPECTACLE PROTECTOR

Application filed October 2, 1928. Serial No. 309,717.

This invention relates to protectors for ophthalmic mountings.

Among the objects of the invention is to provide a removable protector for the extremities of the temples of ophthalmic mountings.

A further object of the invention is to provide a protector which will be receivable over the end of the mounting, and which is adapted to bear against the head of the wearer in such a manner as to protect the head from injury from the free end of the mounting, and to provide a friction member which will prevent the mounting from slipping, and which, at the same time is adapted to relieve the ear from pressure and strain due to supporting the mounting.

A further object of the invention is to provide in a device of the character set forth, means readily removable, which will be simple in operation, and well fitted for economic manufacture.

It will be readily understood that many forms of the present invention may be provided, and that the protecting member may assume various sizes and shapes, and may be receivable over the extremity of the temple bar in a plurality of manners varying from those herein disclosed by way of illustration.

Numerous other objects and features of the present invention will be apparent from a consideration of the following specification taken in connection with the drawings, and in which—

Figure 1:
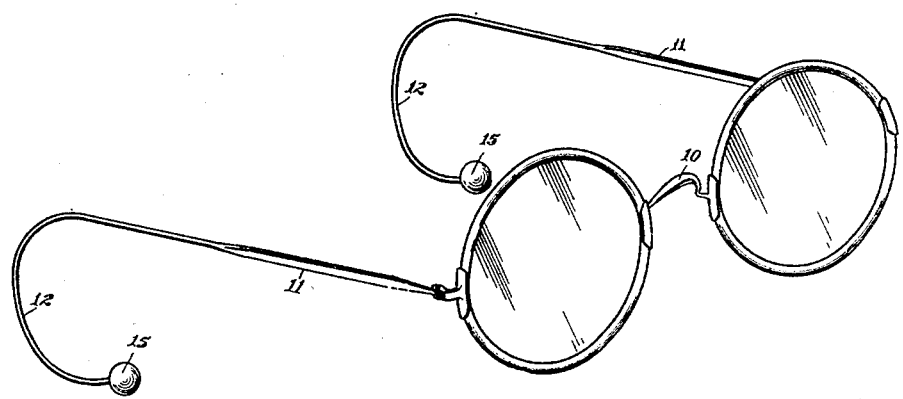
Fig. 1 is a perspective view of an ophthalmic mounting of the ear-engaging type provided with one form of my present invention.

Referring more particularly to Fig. 1 of the drawings, the ophthalmic mounting is illustrated at 10. It includes the usual temple bars 11. It will be understood that the form of mounting herein disclosed is shown merely by way of illustration and that my present invention is applicable to any form of ophthalmic mounting having temple bars or ear-engaging members. In the present illustration, the temple bars are illustrated as being curved downwardly as at 12 to provide members adapted to encircle the ear. On the free ends of the ear-encircling members, the removable protecting member 15 is shown.

The protecting member 15 may be formed from any suitable material. In the present instance it is desired to form the protectors 15 from rubber or other resilient molded material, thus providing a surface engaging portion which will be soft and which will, at the same time, provide a frictional engagement, whereby the surface engaged will not be irritated, and whereby at the same time, the mounting will be retained in properly adjusted position.

Figure 3:
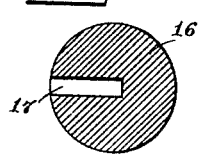
Fig. 3 is a sectional view of that form of my invention illustrated in Fig. 1.

Referring more particularly to Fig. 3, the form of the invention especially applicable to the mounting illustrated in Fig. 1 is herein illustrated, and includes a substantially spherical body having a central body 16 having a central bore 17 adapted to receive the extremity of the ear-engaging portion 12. It will be readily understood that if desired, the bore 17 may be increased in size towards the center of the body 16, whereby the edge portions will provide firmly gripping walls to secure the extremity of the member 12. It will also be understood that the bore 17 may if desired be pre-formed to be of such size and shape as to conform with the particular size and shape of the extremity of the member 12.

Figure 2:
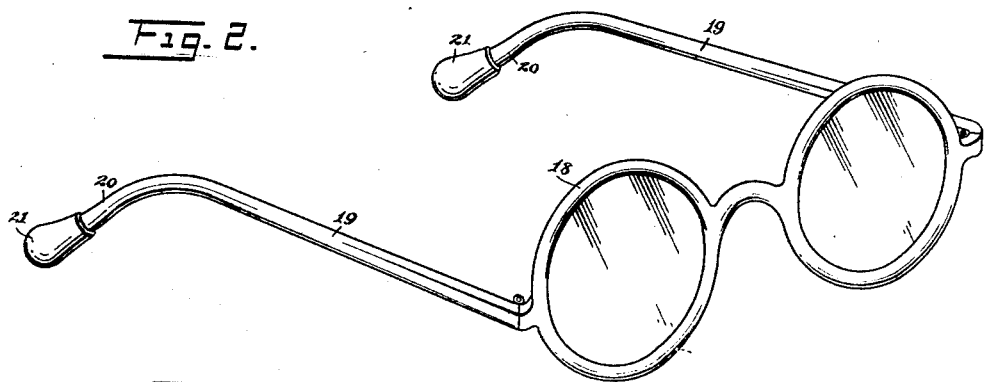
Fig. 2 is a similar view of an ophthalmic mounting provided with skull-engaging temple bars, and provided with a modified form of my invention.
Figure 4:
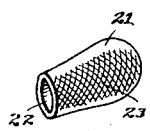
Fig. 4 is a perspective view of that form of my invention as applied to the mounting illustrated in Fig. 2.

Referring more particularly to Figs. 2 and 4 it will be readily seen that the invention is applicable to the skull-engaging temple bar type of ophthalmic mounting as illustrated in Fig. 2, which includes the usual bridge and lens engaging frame 18 and rearwardly extending temple bars 19, the extremities of which are turned downwardly and inwardly to provide engaging portions 20. Protecting members 21 formed in accordance with my present invention are illustrated as receiving the extremities of the portions 20.

By referring to Fig. 4 it will be noted that the cross sections of the bores 22 of the members 21 are such as to properly receive the members 20 and to thus secure the member 21 in proper association therewith. It will be understood that in some instances where the cross section of the members 20 increases toward its end to provide a flat engaging surface, that the member 21 may be formed with a similarly increasing cross section of the bore 22, whereby it will be adapted to conform with the configuration of the member 20. If desired, the inner engaging face of the member 21 may be suitably provided with a frictional surface 23, thus providing means for the prevention of relative motion of the member 21 with the surface engaged, whereby irritation and friction is prevented, and slipping of the ophthalmic mounting is retarded.

Figure 5:
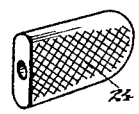
Fig. 5 is a further modified form of the invention.

Referring more particularly to Fig. 5, the form of the invention herein illustrated provides a flat engaging surface preferably provided with suitable friction projections as illustrated at 24. This form of the invention provides for an elongated wide bearing surface, whereby an exceptional proficiency in the grip of the device is provided, and whereby the pressure exerted by the member 12 is properly distributed over the large area.

It will be understood of course that the invention is not confined to the particular form of frictional surface herein illustrated as a cross hatching, and that any desired form of frictional surface may be provided. In this form of the invention, the device is flattened, thus avoiding any undue protrusion of the device from the natural plane in which the member 12 lies.

It will be readily understood that the present invention is designed for bulb type temple bars in which the extremities of the temples are flattened and engage the head of the wearer rearwardly of the ear, rather than being curved around the ear as shown in Fig. 1 of the drawings. It will also be understood that modifications of the temple receiving bar may be resorted to as previously referred to, and that the cross section and configuration of the device may be changed without departing from the spirit or scope of the present invention as outlined in the following claim.

I claim:

In a device of the character described the combination with the temple bars of ophthalmic mounting, of enlarged resilient head clamping members removably mounted on the free ends of said bars, each of said members comprising a substantially flat elongated body, one end of said body being rounded, the other end of said body terminating perpendicular to the axis of said body, said body having a bore extending from said perpendicular end and terminating short of said rounded end to slidingly and removably receive therein and surround the extremity of a temple bar, said body having one side formed with frictional projections positioned to engage the head of the person wearing the device.

JOHN HOUSLEY.